(12) United States Patent
Lee et al.

(10) Patent No.: US 11,960,790 B2
(45) Date of Patent: Apr. 16, 2024

(54) SPATIAL ATTENTION MODEL ENHANCED VOICE ENGAGEMENT SYSTEM

(71) Applicant: Microsoft Technology Licensing, LLC, Redmond, WA (US)

(72) Inventors: Austin S. Lee, Seattle, WA (US); Jonathan Kyle Palmer, Bellevue, WA (US); Anthony James Ambrus, Seattle, WA (US); Mathew J. Lamb, Redmond, WA (US); Sheng Kai Tang, Redmond, WA (US); Sophie Stellmach, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/332,092

(22) Filed: May 27, 2021

(65) Prior Publication Data

US 2022/0382510 A1 Dec. 1, 2022

(51) Int. Cl.
*G06F 3/04817* (2022.01)
*G06F 3/01* (2006.01)
*G06F 3/04815* (2022.01)
*G06F 3/0484* (2022.01)
*G06F 3/16* (2006.01)

(52) U.S. Cl.
CPC .............. *G06F 3/167* (2013.01); *G06F 3/013* (2013.01); *G06F 3/017* (2013.01); *G06F 3/04815* (2013.01); *G06F 3/0484* (2013.01)

(58) Field of Classification Search
None
See application file for complete search history.

(56) References Cited

U.S. PATENT DOCUMENTS

| 5,907,491 A | * | 5/1999 | Canada | G05B 19/4065 |
| | | | | 702/182 |
| 6,396,509 B1 | * | 5/2002 | Cheng | G06F 3/011 |
| | | | | 715/848 |
| 9,250,703 B2 | | 2/2016 | Hernandez-abrego et al. | |

(Continued)

FOREIGN PATENT DOCUMENTS

WO 2019217081 A1 11/2019

OTHER PUBLICATIONS

Park, et al., "A method for increasing user engagement with voice assistant system", In Proceedings of the International Conference on Human-Computer Interaction, Jul. 10, 2020, pp. 146-157.

(Continued)

*Primary Examiner* — Jordany Nunez
(74) *Attorney, Agent, or Firm* — Schwegman Lundberg & Woessner, P.A.

(57) ABSTRACT

A computer implemented method includes detecting user interaction with mixed reality displayed content in a mixed reality system. User focus is determined as a function of the user interaction based on the user interaction using a spatial intent model. A length of time for extending voice engagement with the mixed reality system is modified based on the determined user focus. Detecting user interaction with the displayed content may include tracking eye movements to determine objects in the displayed content at which the user is looking and determining a context of a user dialog during the voice engagement.

20 Claims, 4 Drawing Sheets

(56) References Cited

U.S. PATENT DOCUMENTS

| | | | |
|---|---|---|---|
| 9,323,325 B2 | 4/2016 | Perez et al. | |
| 10,199,051 B2* | 2/2019 | Binder | G10L 15/22 |
| 10,317,992 B2 | 6/2019 | Prokofieva et al. | |
| 10,802,582 B1 | 10/2020 | Clements | |
| 10,831,268 B1 | 11/2020 | Golard et al. | |
| 10,890,759 B1* | 1/2021 | Held | G06F 3/011 |
| 10,921,896 B2 | 2/2021 | Lopez et al. | |
| 11,016,303 B1* | 5/2021 | Kennedy | G06F 3/013 |
| 11,221,669 B2* | 1/2022 | White | G06F 3/017 |
| 11,270,672 B1* | 3/2022 | Lee | G06F 3/011 |
| 11,609,627 B2* | 3/2023 | Qian | G06F 3/167 |
| 2009/0228841 A1* | 9/2009 | Hildreth | G06F 3/0304 |
| | | | 715/863 |
| 2012/0019557 A1* | 1/2012 | Aronsson | G06T 11/00 |
| | | | 345/633 |
| 2012/0089488 A1* | 4/2012 | Letchford | G06Q 30/02 |
| | | | 705/27.2 |
| 2013/0166408 A1* | 6/2013 | Edwards | G06F 3/04842 |
| | | | 705/26.7 |
| 2014/0184550 A1 | 7/2014 | Hennessey et al. | |
| 2016/0196692 A1* | 7/2016 | Kjallstrom | G06F 3/011 |
| | | | 345/633 |
| 2018/0301151 A1* | 10/2018 | Mont-Reynaud | G10L 15/22 |
| 2018/0350353 A1* | 12/2018 | Gruber | G10L 15/1822 |
| 2019/0054371 A1* | 2/2019 | Hamilton | G02B 27/017 |
| 2019/0187787 A1* | 6/2019 | White | G06F 3/013 |
| 2019/0251701 A1* | 8/2019 | Shukla | G06N 3/006 |
| 2019/0253724 A1* | 8/2019 | Nelson | G06T 15/08 |
| 2020/0020337 A1* | 1/2020 | Lee | G06F 3/013 |
| 2020/0064458 A1* | 2/2020 | Giusti | G01S 7/02 |
| 2020/0272231 A1 | 8/2020 | Klein et al. | |
| 2021/0082397 A1* | 3/2021 | Kennewick | G10L 15/05 |
| 2021/0173475 A1* | 6/2021 | Qian | G06F 3/04842 |
| 2021/0312684 A1* | 10/2021 | Zimmermann | G02B 27/0172 |

OTHER PUBLICATIONS

Sostel, "Eye-gaze and commit", Retrieved from: https://docs.microsoft.com/en-us/windows/mixed-reality/design/gaze-and-commit-eyes, May 5, 2019, 3 Pages.

Coulter, et al., "Eye-gaze-based interaction on HoloLens 2", Retrieved from: https://docs.microsoft.com/en-us/windows/mixed-reality/design/eye-gaze-interaction, Oct. 29, 2019, 7 Pages.

"International Search Report and Written Opinion Issued in PCT Application No. PCT/US22/026872", dated Jul. 21, 2022, 9 Pages.

Office Action Received for European Application No. 22729844.5, mailed on Jan. 9, 2024, 03 pages.

* cited by examiner

SPATIAL ATTENTION MODEL ENHANCED VOICE ENGAGEMENT SYSTEM

BACKGROUND

Voice-enabled systems listen for an arbitrary length of time to ensure users can continuously use multiple voice commands before the systems stop listening. The length of time may be selected to avoid having the user repeatedly say a voice invocation wake word every single time for multiple voice inputs. After the length of time from the last voice command expires, the system stops listening and returns to an idle state. If the user desires to enter another voice command, the wake word must first be repeated.

In one prior method, user interaction with a virtual assistant may be used to maintain voice interaction with the virtual assistant. The user interaction is tracked to identify gaze at the virtual assistant and gesture/voice commands interacting with the virtual assistant to maintain engagement with the virtual assistant. As long as the user makes eye contact with the virtual assistant, the ability to interact with the virtual assistant is maintained. User eye gaze in mixed reality environments is constantly moving. Such eye movement can result in false negatives or even false positives regarding the user desire to interact with the virtual assistant, causing commands to be missed by the virtual assistant.

SUMMARY

A computer implemented method includes detecting user interaction with mixed reality displayed content in a mixed reality system. User focus is determined as a function of the user interaction based on the user interaction using a spatial intent model. A length of time for extending voice engagement with the mixed reality system is modified based on the determined user focus. Detecting user interaction with the displayed content may include tracking eye movements to determine objects in the displayed content at which the user is looking and determining a context of a user dialog during the voice engagement.

DETAILED DESCRIPTION

Figure 1:
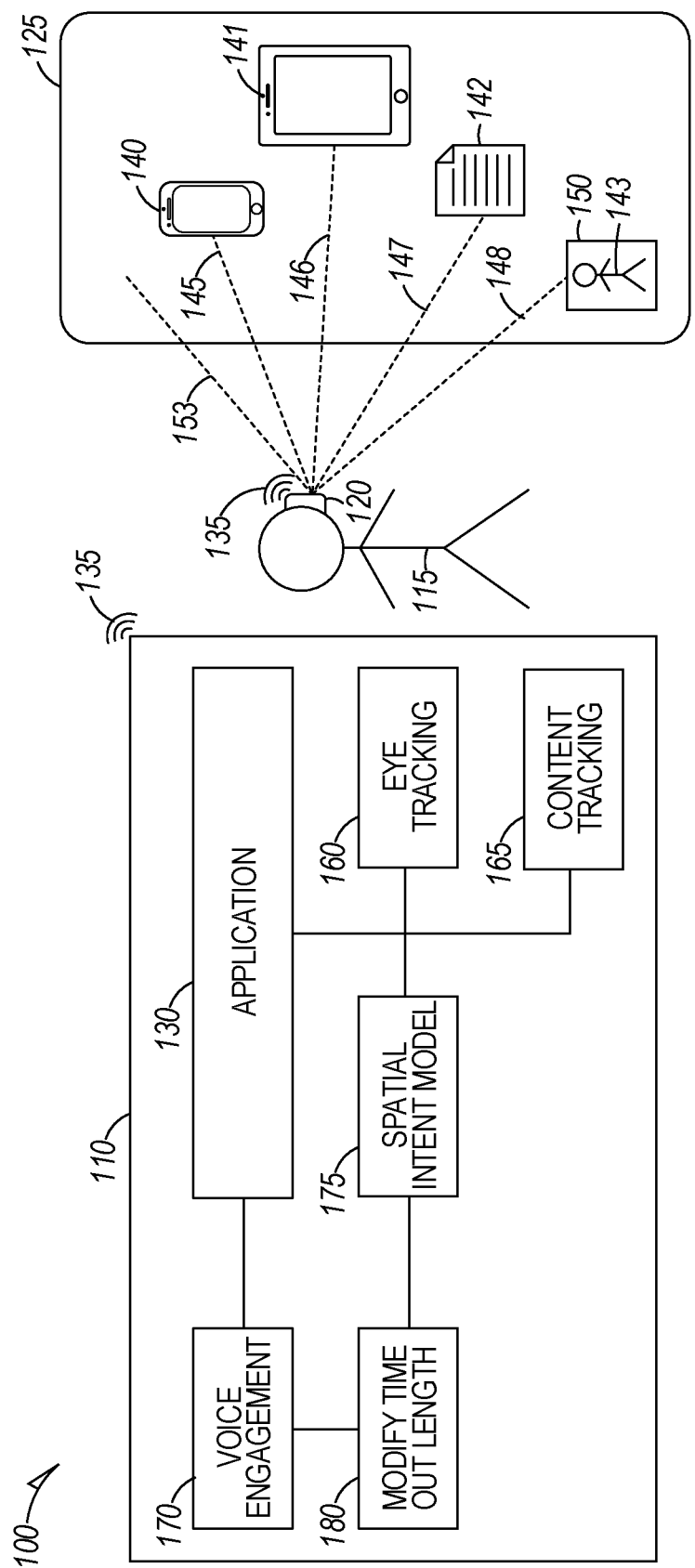
FIG. 1 is a block diagram view of a system for managing voice engagement via a voice engagement system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A spatial attention model enhanced voice engagement system enables a user to maintain contextual conversation with a voice-enabled system taking into account what the user is visually observing. Maintaining the contextual conversation with the voice-enabled system may also be based on a context of the user's dialog with the voice engagement system.

In one example, a user can gaze at a voice-enabled signifier to wake the voice engagement system and begin a voice engagement dialog. The signifier may be one or more of an embodied virtual agent in mixed reality, a voice-enabled smart speaker, or a user interface object in mixed reality. The signifier may also display various states of the voice engagement system during the voice experience, such as ready—listening, voice input, acknowledgment, processing, task completion, return to ready state, and voice time out. The signifier can show when the voice engagement system is about to stop listening and return to the idle state, which could afford the user to explicitly extend a length of time for the voice engagement to time out, enabling further voice commands to be provided without having to wake the voice engagement system again.

Multiple signals, such as contextual utterance and focus target areas are used by a spatial intent model to extend the duration of the voice engagement. To deal with gaze drifting away from the focus area the spatial intent model may be used to predict the ranking of user interface objects or target areas that is most focused on by the user inside the user's field of view. For example, frequency or duration of the gaze can be the signals used in the spatial intent model. The voice engagement system can implicitly extend the continuous voice engagement when a user is using contextual voice commands while staying focused on the target content/area.

FIG. 1 is a functional block diagram view of a system 100 for managing voice engagement via a voice engagement system 110 with a user 115. User 115 may be using a head mounted display 120 such as smart goggles or smart glasses that provide a mixed reality view 125. The mixed reality view may be provided by a mixed reality application 130. In one example, the voice engagement system 110 shares the same processing resources as the mixed reality application 130. The display 120 and system 110 wireless communicate with each other as indicated by wireless symbols 135.

The display 120 includes a microphone, speaker, and eye tracking cameras. Data collected by the display 120 are communicated wirelessly to system 110. Data generated by application 130 is also communicated wirelessly to the display 120 for generating the mixed reality view 125. The mixed reality view 125 may include several different objects indicated at 140, 141, 142, and 143. Each of these objects have known locations in the view and can be correlated to locations that eye tracking data indicates the user is looking at as indicate by gaze lines 145, 146, 147, and 148 respectively.

The objects may be holograms, which are virtual objects generated by application 130, or real objects that actually exist. Object 143 for example is a person, which may be real, or may even be an avatar, which is referred to as a hologram. Object 143 includes a bounding box 150 which encloses the object 143. Gaze line 148 being directed at the bounding box 150 may be interpreted as a gaze at object 143.

Object 143 for example may be a document that is being modified or viewed by the user 115. The document can also be real or virtual. In one example, a further gaze line 153 is directed to an area in the view in which no real or virtual object is located.

In one example, object 140 may be a voice-enabled signifier, such as a virtual assistant. Gazing at object 140 may automatically wake voice engagement 170 to begin a dialog. In some examples, gazing at object 140 may also signify a desire to continue the dialog.

System 110 include several functions that keep track of user 115 interaction with the virtual environment, and by extension, application 130. Eye tracking 160 is a function that receives the gaze data indicative of where the user is gazing. Eye tracking 160 may keep track of actual objects or areas where the user is looking by identifiers of the objects or areas. Eye tracking 160 may also keeping a history of actual times at which the gaze is directed at such objects or areas. The history allows identification of a ranked list of objects to which the user is most likely paying the most attention.

Context tracking 165 is a function used to generate a context for conversation or dialog occurring between the user 115 and a voice engagement 170 function. The context may include a name of the object to which voice commands and optionally gestures are being directed to by the user 115, as well as the commands and gestures themselves. The context may also include information identifying a state of the application 130 to which the commands are being applied. Note that the application 130 may include word processing functions, browsers, spreadsheets, shopping applications, and may other types of applications that may be used to interact with the mixed reality view 125.

Data from eye tracking 160 and context tracking 165 functions is provided to a spatial intent model 175. Model 175 processes the received data to determine a focus of the user 115 in terms of continuing the dialog with the voice engagement 170 function. The model 175 may indicate that the user focus is directed to the current dialog by simply using the top ranked object and comparing it to the context. A positive comparison results in the spatial intent model indicating that the time should be extended via a modify timeout length function 180, which provides an extension time to voice engagement 170 to extend the active voice engagement. The timeout length is a time used to continue active voice engagement. At the end of the timeout, active voice engagement will return to an idle state and wait for engagement with the signifier to wake for further active voice engagement.

In one example, the frequency of gazing at each object is tracked, along with lengths of gazes, and most recent time of gaze. That data, along with timing of dialog corresponding to objects being gazed at may be used to determine that time should be extended.

In the case of a person other than the user beginning to talk, the gaze data will be indicative of the user either looking at the person, in which case, the voice engagement may be stopped by modifying the time to be zero or near zero. However, if the user is looking back and forth between the person and an object related to the context, the voice engagement timeout value may be extended.

Further examples may be application specific. If a form is being filled out as reflected in the context, and the user is gazing at different objects as well as the form, the voice engagement timeout length value may also be extended. However, if the user opens a new application, or begins looking longer at an object not related to the current context, the voice engagement may be stopped, or at least the timeout length value may not be increased.

Past history with application interaction may also be included in the context data and used by the model to determine whether or not to modify the length of the timeout. If a user frequently has long dialogs with the application with periods of inaction, the length of time may also be extended.

If a movie delivery application has been opened, and the user is gazing at multiple different objects, such as objects representative of different movies or other shows, voice engagement may also be extended, as the context indicates that a voice command is likely to be an interaction with the movie delivery application.

If a shopping application is open, the context will reflect that. If the user is gazing at different objects to order, voice engagement may also be extended. Similarly, if a user returns to an application where voice commands were being used, voice engagement may be activated automatically as well as extended. The same may occur for opening a new application where voice commands were previously commonly used by the user.

In one example, model 175 may be a machine learning model, such as neural network model that is trained based on labeled examples of the data generated by the eye tracking 160 and context tracking 165 functions. The labels may indicate whether or not to extend the time by one or more amounts, or even whether or not to disengage voice engagement immediately. The examples may include the above listed examples with the labels manually generated, or automatically generated by noting that the user performed an express action to reengage voice engagement for a particular context with corresponding eye tracking data.

Figure 2:
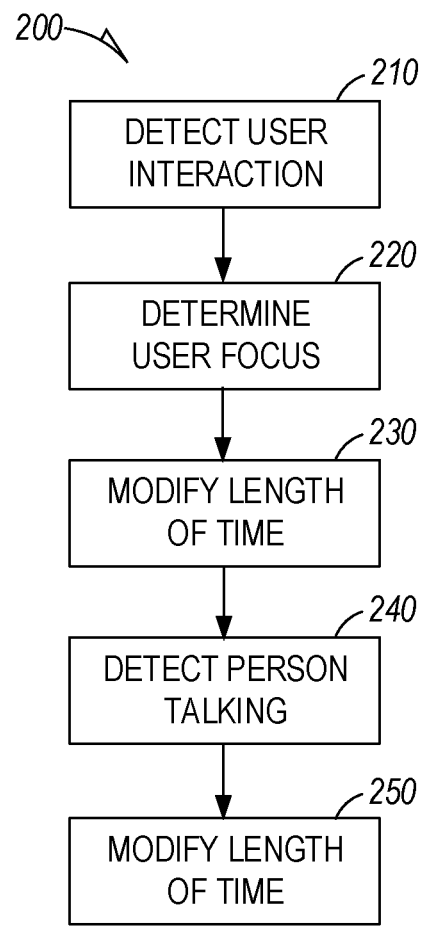
FIG. 2 is a flowchart illustrating a computer implemented method of modifying a timeout for voice engagement according to an example embodiment.

FIG. 2 is a flowchart illustrating a computer implemented method 200 of modifying a timeout for voice engagement according to an example embodiment. Method 200 begins at operation 210 by detecting user interaction with mixed reality displayed content.

User focus on the mixed reality displayed content is determined at operation 220 by using a spatial intent model. The spatial intent model ranks objects and areas in the displayed content as a function of frequency and duration of gaze. At operation 230, a length of time for extending voice engagement is modified based on the determined user focus.

Voice engagement may initially be enabled in response to the user gazing at a voice engagement initiation object in the mixed reality environment or by speaking a voice engagement wake phrase. The voice engagement initiation object may be a hologram or physical object.

In one example, the context comprises interacting with an application. The length of time is modified as a function of past user interaction with the application. The application may be in a state where more information from the user is being collected, indicating the length of the timeout should be extended. The tracked eye movements may be indicative of the user looking around at the displayed content demonstrating an intent to obtain more information, also indicating the length of the timeout should be extended.

Method 200 may also detect at operation 240 that a person other than the user is talking. The length of time may be modified at operation 250 to discontinue voice engagement in response to the object at which the user is looking being the person that is talking.

Figure 3:
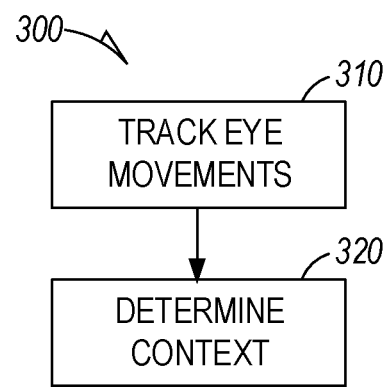
FIG. 3 is a flowchart of a computer implemented method for detecting user interaction with the displayed content according to an example embodiment.

FIG. 3 is a flowchart of a computer implemented method 300 for detecting user interaction with the displayed content according to an example embodiment. At operation 310, eye movements are tracked to determine objects in the displayed content at which the user is looking. Operation 320 determines a context of a user dialog during the voice engagement. The user dialog may include voice commands and gesture commands. The length of time is modified at operation 230 as a function of the ranks and a determined context.

Figure 4:
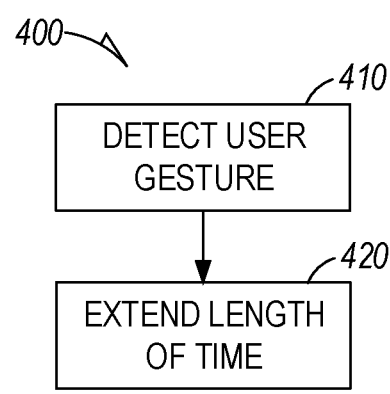
FIG. 4 is a flowchart of a computer implemented method for extending the length of voice engagement based on detected user gestures.

FIG. 4 is a flowchart of a computer implemented method 400 for extending the length of voice engagement based on detected user gestures. Method 400 may be begin at operation 410 by detecting a user gesture representative of intent to continue the user dialog during voice engagement. The user gesture, for example, may be the user holding up an index finger, which is commonly used in human to human interaction to signify a desire to continue a conversation after a short pause. At operation 420, the length of time for voice engagement is extended in response to detecting the user gesture. The length of time may continuously be extended as long as the gesture is maintained in one example.

Figure 5:
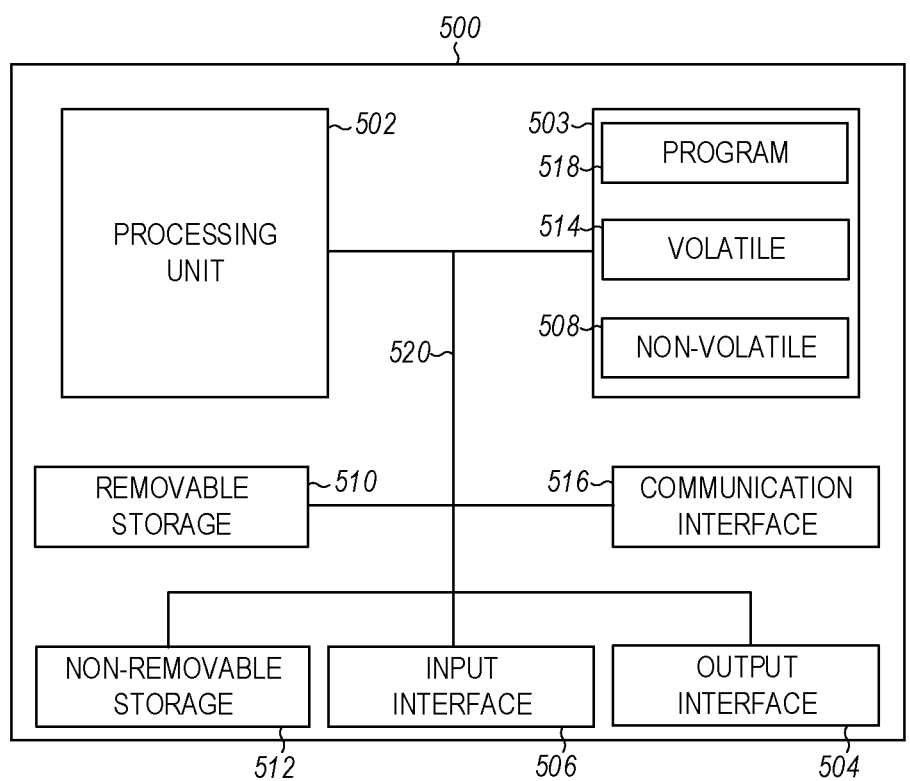
FIG. 5 is a block schematic diagram of a computer system to implement one or more example embodiments.

FIG. 5 is a block schematic diagram of a computer system 500 for executing applications for a mixed realty experience, performing voice engagement, tracking user interactions with the mixed reality experience, extending the length of time for voice engagement and for performing methods and algorithms according to example embodiments. All components need not be used in various embodiments, such as for example, head mounted display devices.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

Examples

1. A computer implemented method includes detecting user interaction with mixed reality displayed content, determining user focus as a function of the user interaction using a spatial intent model, and modifying a length of time for extending voice engagement based on the determined user focus.

2. The method of example 1 wherein detecting user interaction with the displayed content includes tracking eye movements to determine objects in the displayed content at which the user is looking and determining a context of a user dialog during the voice engagement.

3. The method of example 2 wherein the spatial intent model ranks objects and areas in the displayed content as a function of frequency and duration of gaze.

4. The method of example 3 wherein the length of time is modified as a function of the ranks and determined context.

5. The method of any of examples 2-4 and further including detecting that a person other than the user is talking and wherein the length of time is modified to discontinue voice engagement in response to the object at which the user is looking being the person that is talking.

6. The method of any of examples 2-5 wherein the user dialog comprises voice commands and gesture commands.

7. The method of any of examples 2-6 wherein the context comprises interacting with an application, and wherein the length of time is modified as a function of past user interaction with the application.

8. The method of example 7 wherein the application is in a state where more information from the user is being collected and the tracked eye movements are indicative of the user looking around at the displayed content demonstrating an intent to obtain more information.

9. The method of any of examples 1-8 wherein voice engagement is enabled in response to the user gazing at a voice engagement initiation object in a mixed reality environment or speaking a voice engagement wake phrase.

10. The method of example 9 wherein the voice engagement initiation object comprises a hologram or physical object.

11. The method of any of examples 1-10 and further including detecting a user gesture representative of intent to continue to the user dialog during voice engagement and extending the length of time for voice engagement in response to detecting the user gesture.

12. A machine-readable storage device has instructions for execution by a processor of a machine to cause the processor to perform operations to perform a method. The operations include detecting user interaction with mixed reality displayed content, determining user focus as a function of the user interaction using a spatial intent model, and modifying a length of time for extending voice engagement based on the determined user focus.

13. The device of example 12 wherein detecting user interaction with the displayed content includes tracking eye movements to determine objects in the displayed content at which the user is looking and determining a context of a user dialog during the voice engagement.

14. The device of example 13 wherein the spatial intent model ranks objects and areas in the displayed content as a function of frequency and duration of gaze and wherein the length of time is modified as a function of the ranks and determined context.

15. The device of any of examples 13-14 wherein the operations further include detecting that a person other than the user is talking and wherein the length of time is modified to discontinue voice engagement in response to the object at which the user is looking being the person that is talking.

16. The device of any of examples 13-15 wherein the context includes interacting with an application, and wherein the length of time is modified as a function of past user interaction with the application and wherein the application is in a state where more information from the user is being collected and the tracked eye movements are indicative of the user looking around at the displayed content demonstrating an intent to obtain more information.

17. The device of any of examples 12-16 wherein voice engagement is enabled in response to the user gazing at a voice engagement initiation object in a mixed reality environment or speaking a voice engagement wake phrase.

18. The device of example 17 wherein the voice engagement initiation object comprises a hologram or physical object.

19. The device of any of examples 12-18 wherein the operations further include detecting a user gesture representative of intent to continue to the user dialog during voice engagement and extending the length of time for voice engagement in response to detecting the user gesture.

20. A device includes a processor and a memory device coupled to the processor and having a program stored thereon for execution by the processor to perform operations. The operations include detecting user interaction with mixed reality displayed content, determining user focus as a function of the user interaction using a spatial intent model, and modifying a length of time for extending voice engagement based on the determined user focus.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A computer implemented method comprising:
  initiating voice engagement to interact with an application object;
  detecting user interaction with mixed reality displayed content that includes interaction with the application object and user interaction with other displayed objects;

determining a context of a user dialog during the voice engagement, wherein the context includes voice commands and a state of the application object;

determining user focus as a function of the user interaction with the mixed reality displayed content and the context using a spatial intent model; and modifying a length of time for extending the voice engagement with the application object based on the determined user focus being related to continuing the voice engagement.

2. The method of claim 1 wherein detecting user interaction with the displayed content comprises:

tracking eye movements to determine objects in the displayed content at which the user is looking; and determining a context of a user dialog during the voice engagement.

3. The method of claim 2 wherein the spatial intent model ranks objects and areas in the displayed content as a function of frequency and duration of gaze.

4. The method of claim 3 wherein the length of time is modified as a function of the ranks and determined context.

5. The method of claim 2 and further comprising:

detecting that a person other than the user is talking; and wherein the length of time is modified to discontinue voice engagement in response to the object at which the user is looking being the person that is talking.

6. The method of claim 2 wherein the user dialog comprises voice commands and gesture commands and wherein the spatial intent model is a neural network model trained on tracked eye movements and determined context for interactions with the displayed content.

7. The method of claim 2 wherein the context comprises interacting with the application, and wherein the length of time is modified as a function of past user interaction with the application.

8. The method of claim 7 wherein the application is in a state where more information from the user is being collected and the tracked eye movements are indicative of the user looking around at the displayed content demonstrating an intent to obtain more information.

9. The method of claim 1 wherein voice engagement is initiated in response to the user gazing at a voice engagement initiation object in a mixed reality environment or speaking a voice engagement wake phrase.

10. The method of claim 9 wherein the voice engagement initiation object comprises a hologram or physical object.

11. The method of claim 1 and further comprising:

detecting a user gesture representative of intent to continue the user interaction during voice engagement; and extending the length of time for voice engagement in response to detecting the user gesture.

12. A machine-readable storage device having instructions for execution by a processor of a machine to cause the processor to perform operations to perform a method, the operations comprising:

initiating voice engagement to interact with an application object;

detecting user interaction with mixed reality displayed content that includes interaction with the application object and user interaction with other displayed objects;

determining a context of a user dialog during the voice engagement, wherein the context includes voice commands and a state of the application object;

determining user focus as a function of the user interaction with the displayed content using a spatial intent model; and modifying a length of time for extending the voice engagement with the application object based on the determined user focus.

13. The device of claim 12 wherein detecting user interaction with the displayed content comprises:

tracking eye movements to determine objects in the displayed content at which the user is looking; and determining a context of a user interaction during the voice engagement.

14. The device of claim 13 wherein the spatial intent model ranks objects and areas in the displayed content as a function of frequency and duration of gaze and wherein the length of time is modified as a function of the ranks and determined context.

15. The device of claim 13 wherein the operations further comprise:

detecting that a person other than the user is talking; and wherein the length of time is modified to discontinue voice engagement in response to the object at which the user is looking being the person that is talking.

16. The device of claim 13 wherein the context comprises interacting with the application, and wherein the length of time is modified as a function of past user interaction with the application and wherein the application is in a state where more information from the user is being collected and the tracked eye movements are indicative of the user looking around at the displayed content demonstrating an intent to obtain more information.

17. The device of claim 12 wherein voice engagement is initiated in response to the user gazing at a voice engagement initiation object in a mixed reality environment or speaking a voice engagement wake phrase.

18. The device of claim 17 wherein the voice engagement initiation object comprises a hologram or physical object.

19. The device of claim 12 wherein the operations further comprise:

detecting a user gesture representative of intent to continue the user interaction during voice engagement; and extending the length of time for voice engagement in response to detecting the user gesture.

20. A device comprising:

a processor; and a memory device coupled to the processor and having a program stored thereon for execution by the processor to perform operations comprising:

initiating voice engagement to interact with an application object;

detecting user interaction with mixed reality displayed content that includes interaction with the application object and user interaction with other displayed objects;

determining a context of a user dialog during the voice engagement, wherein the context includes voice commands and a state of the application object;

determining user focus as a function of the user interaction with the displayed content using a spatial intent model; and modifying a length of time for extending the voice engagement with the application object based on the determined user focus.

* * * * *